United States Patent [19]

Shinozaki et al.

[11] Patent Number: 4,648,474
[45] Date of Patent: Mar. 10, 1987

[54] AIR CLEANER SYSTEM FOR MOTORCYCLES

[75] Inventors: Takashi Shinozaki; Satoshi Ishikawa, both of Saitama, Japan

[73] Assignee: Honda Giken Kogyo Kabushiki Kaisha, Tokyo, Japan

[21] Appl. No.: 536,245

[22] Filed: Sep. 27, 1983

[30] Foreign Application Priority Data

Sep. 29, 1982 [JP] Japan .............................. 57-170216
Sep. 29, 1982 [JP] Japan .............................. 57-170214
Sep. 29, 1982 [JP] Japan .............................. 57-170213
Sep. 29, 1982 [JP] Japan .............................. 57-170217

[51] Int. Cl.⁴ .................. B60K 11/06; B60K 13/02; B60K 15/02
[52] U.S. Cl. ............................. 180/219; 55/385 B; 123/52 M; 165/42; 180/68.1; 180/69.24; 180/225; 180/229; 280/5 A
[58] Field of Search ............. 180/219, 225, 229, 68.1, 180/68.2, 68.3, 69.2, 69.24, 54.1, 291; 123/52 M; 55/385 B; 280/5 A; 165/41, 42, 44, 51

[56] References Cited

U.S. PATENT DOCUMENTS

| | | | |
|---|---|---|---|
| 1,510,937 | 10/1924 | Harley et al. | 180/219 |
| 2,329,248 | 9/1943 | Carlson | 180/219 |
| 3,944,009 | 3/1976 | Katagiri | 180/219 |
| 4,280,582 | 7/1981 | Kouyama et al. | 180/225 X |
| 4,319,657 | 3/1982 | Nomura | 180/219 |
| 4,321,978 | 3/1982 | Tominaga et al. | 55/385 B X |
| 4,327,930 | 5/1982 | Tominaga et al. | 280/284 |
| 4,354,570 | 10/1982 | Tanaka et al. | 180/219 |
| 4,412,596 | 11/1983 | Pudil et al. | 55/385 B X |
| 4,484,651 | 11/1984 | Hattori et al. | 55/385 B X |
| 4,509,613 | 4/1985 | Yamaguchi | 55/385 B X |

FOREIGN PATENT DOCUMENTS

| | | | |
|---|---|---|---|
| 21657 | 1/1981 | European Pat. Off. | 180/229 |
| 377391 | 6/1923 | Fed. Rep. of Germany | 180/225 |
| 762952 | 2/1954 | Fed. Rep. of Germany . | |
| 2284509 | 4/1975 | France . | |
| 2533633 | 3/1984 | France | 180/229 |
| 132418 | 10/1981 | Japan | 123/52 M |
| 138714 | 2/1920 | United Kingdom | 180/229 |
| 737327 | 9/1955 | United Kingdom | 55/385 B |

Primary Examiner—John J. Love
Assistant Examiner—Mitchell J. Hill
Attorney, Agent, or Firm—Lyon & Lyon

[57] ABSTRACT

An air cleaner system for motorcycles employing the hollow interior of a main frame member. A U-shaped cavity facing forwardly of the motorcycle in the fuel tank allows access to the air cleaner assembly positioned within the main frame member. An inlet opening is provided on the upper surface of the main frame member while outlet openings on the lower surface thereof extend to carburetors. The inlet opening of the main frame member is reinforced and a baffle is positioned between the air filter assembly and the intake passages to the carburetors.

14 Claims, 6 Drawing Figures

AIR CLEANER SYSTEM FOR MOTORCYCLES

BACKGROUND OF THE INVENTION

The field of the present invention is air filtering devices for the intake systems on motorcycles.

Conventional motorcycle design generally includes a centrally positioned engine surrounded by a frame structure including a head pipe, a down tube structure extending downwardly and then rearwardly from the head pipe, a main frame structure extending rearwardly from the head pipe to a center frame structure extending downwardly to meet with the rearward portion of the down tube structure. A fuel tank is positioned on the main frame structure between the head tube and a seat, the seat generally being supported behind the center frame structure. With V-type, multicylinder engines having a transverse crankshaft, the intake system, including intake passages to the engine, are often positioned generally above the engine and below the main frame structure on the motorcycle. The provision for air filtering mechanisms in such a location is limited by available space, access for maintenance and the like. To provide adequate periods between service, air cleaner systems having filters with substantial filter areas are beneficial. However, such cleaning systems may interfere with the location of other components, may extend unduly from the profile of the motorcycle or may otherwise require an accommodation in design constituting a compromise with other competing considerations. As a result, access for service, filter area and other design considerations for such an air cleaning system may be compromised as well.

SUMMARY OF THE INVENTION

The present invention pertains to an air cleaning system for motorcycles employing a filter element located in a hollow main frame member of the motorcycle structure. Through the location of an air cleaner assembly in a hollow main frame member, a more compact design may be achieved along with improved access for service and more available space for competing components. In accomplishing the foregoing, a first aspect of the present invention is directed to the provision of a fuel tank including a forwardly facing U-shaped cavity positioned on the main frame member. Such a fuel tank arrangement provides access to the main frame member at a location for service of a filter element contained within the main frame member.

To provide for the placement of an air filter in the main frame member of the motorcycle, a hole must be provided through the frame member. The placement of such a hole may affect the structural integrity of the frame member in that stress raisers may be created. To eliminate any such increased stress without significantly increasing the weight of the vehicle, a reinforcing plate may be employed about the periphery of the hole through the main frame member.

In a further aspect of the present invention, the air filter is associated with a cover extending across the inlet to the interior of the main frame member. The cover may then provide a barrier to air flow about the air filter to allow communication only through the air filter. Additionally, the air filter may be assembled with the cover such that removal of the cover results in removal of the air filter for immediate access to the filter for service. Complicated passages need not be provided in the main frame member with this arrangement. Indeed, outlet ports through the underside of the main frame member provide direct access to the adjacent intake passages to the engine.

Because of the compact nature of motorcycle designs, it is advantageous to arrange the engine and main frame member such that they are relatively close. As a consequence of this placement, the air filter may be located relatively close to the intake porting resulting in the possibility of soiling the filter of the air cleaner element by back-draft from the carburetor. In a further aspect of the present invention, a baffle is arranged within the main frame member so as to allow adequate air flow without restriction from the filter element to the air intake passages of the intake system and yet shield the filter material from direct back-draft of the carburetor.

Accordingly, it is a principal object of the present invention to provide an improved air cleaner system for motorcycles. Other and further objects and advantages will appear hereinafter.

DETAILED DESCRIPTION OF THE PREFERRED EMBODIMENT

Figure 1:
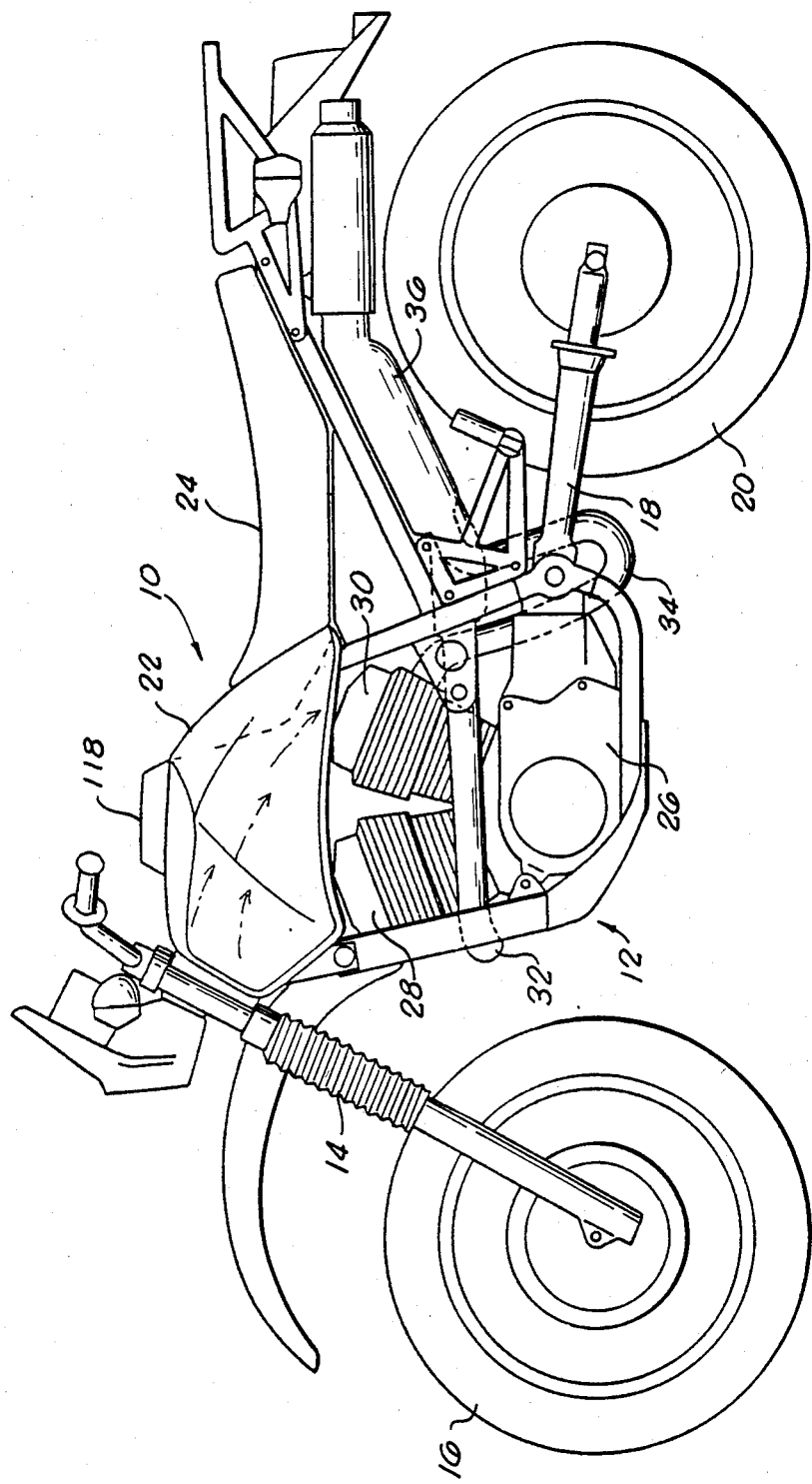
FIG. 1 is a cross-sectional side elevation of a motorcycle incorporating the present invention.

Turning in detail to the drawings, a motorcycle, generally designated 10, is illustrated as including a frame structure 12, a front steering and suspension system 14, a front wheel 16, a rear suspension system 18 and a rear wheel 20. Mounted on the frame structure 12 is a fuel tank 22, a seat 24 and other components as may be easily identified. Centrally mounted within the frame structure 12 is an engine and drive train assembly 26 illustrated to be of a V-type multicylinder engine having cylinder blocks 28 and 30. Exhaust pipes 32 and 34 extend to a muffler assembly 36.

Figure 2:
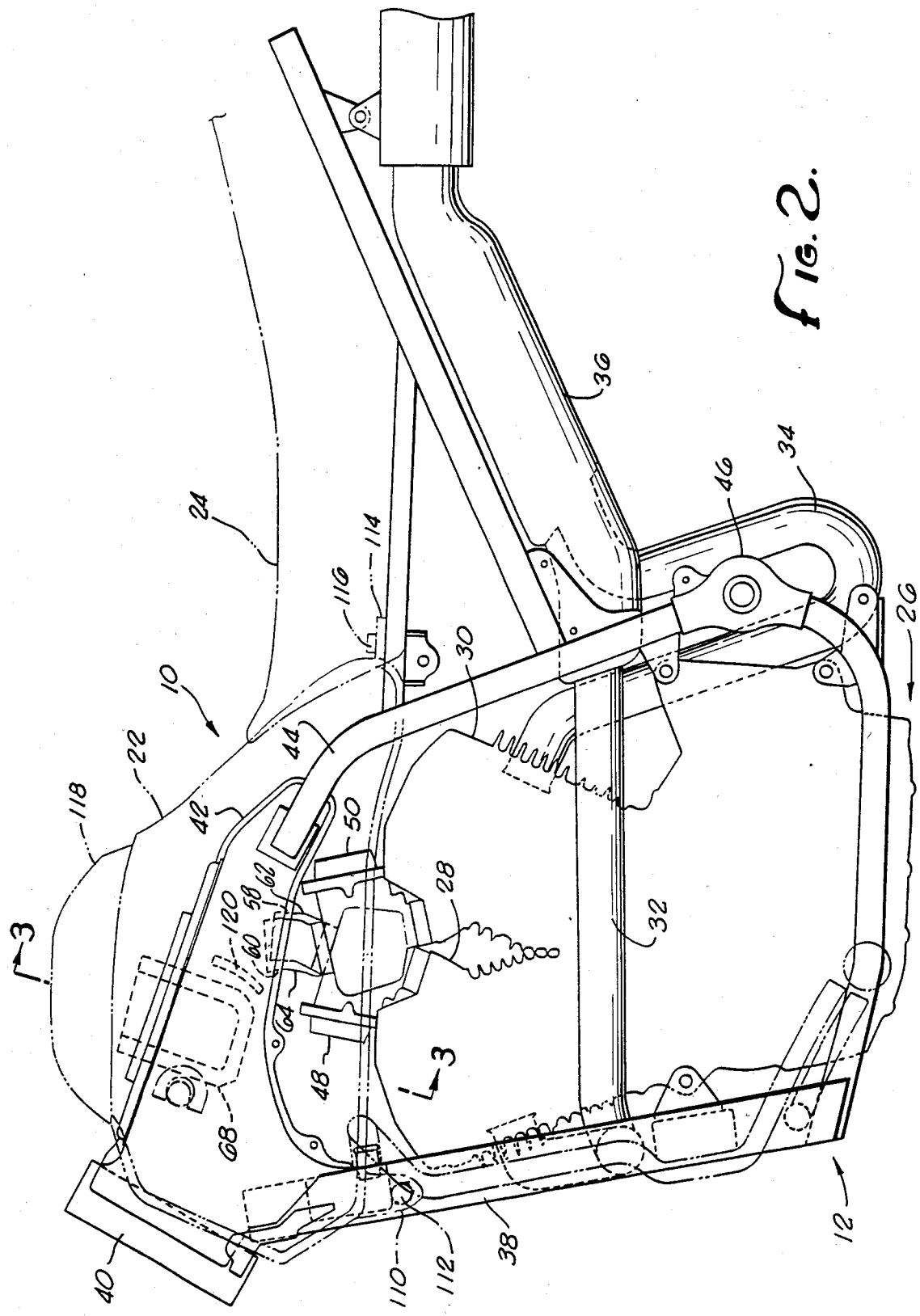
FIG. 2 is a side elevation detail illustrating the structure of a motorcycle incorporating the present invention.

Looking to the frame structure 12 in greater detail in FIG. 2, a down tube assembly 38 extends downwardly and rearwardly from a head pipe 40. A main frame member 42 extends rearwardly from the head pipe 40 to a centerframe structure 44. The centerframe structure 44, including two elements extends downwardly to meet with the head pipe structure 38 at a rear suspension mount 46. The down tube structure 38 extending rearwardly beneath the engine and drive train assembly defines an undercarriage which, in combination with the main frame member 42 and the center frame structure 44, define a structural cavity for receipt of the engine and drive train assembly 26. Two carburetors 48 and 50 are positioned upwardly from between the cavity formed by the V-arrangement of the cylinder blocks 28 and 30. Thus located, the carburetors 48 and 50 are directly beneath the main frame member 42.

Figure 3:
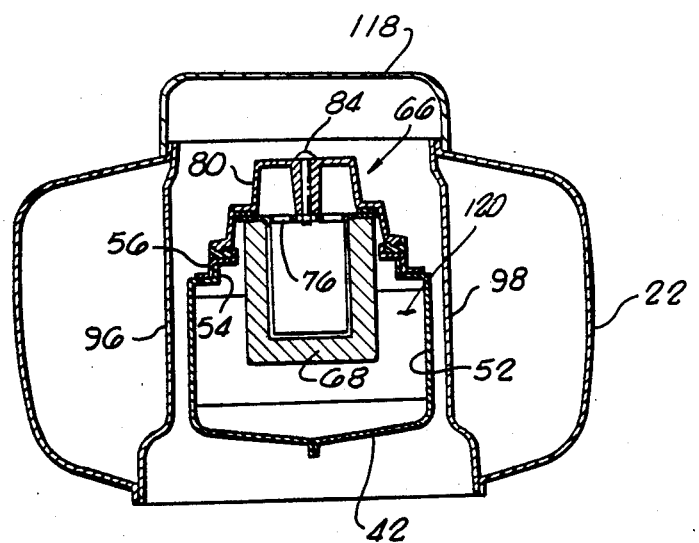
FIG. 3 is a cross-sectional end view taken along line 3—3 of FIG. 2.
Figure 6:
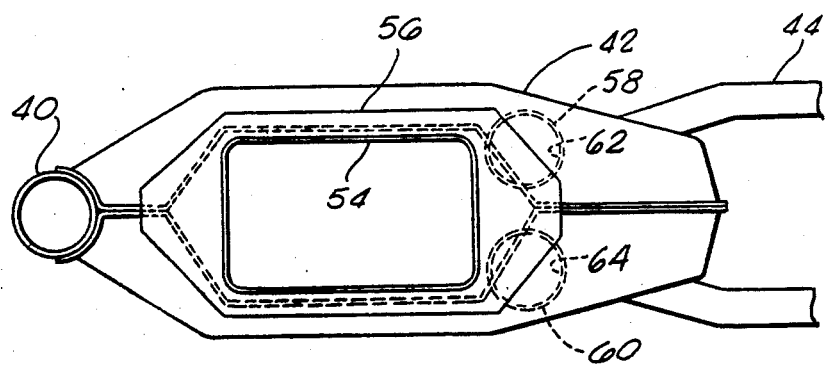
FIG. 6 is a plan view of a main frame member of the present invention.

Looking to FIG. 2 and additionally to FIG. 3, the structure of the main frame member 42 is shown to be of hollow construction forming an interior cavity 52. The interior cavity 52 may generally include the entire inner portion of the main frame member 42. This hollow structure extends from the head pipe 40 to the center frame structure 44. The centerframe structure 44 includes two members extending from either side of main frame member 42 as may best be seen in FIGS. 2 and 6. The main frame member 42 is generally formed as a box section having a rectangular cross section. To provide lightness and strength, the box section of the main frame member 42 may be formed of sheet steel welded or spot welded together at mating flanges top and bottom.

The main frame member 42 includes an inlet opening 54 in the upper side of the main frame member. Surrounding the opening 54 is a reinforcing plate 56. The reinforcing plate 56 is formed to conform to the upper surface of the main frame member 42 about the periphery of the inlet 54 as may be seen in FIG. 3. The reinforcing plate 56, welded or otherwise affixed to the main frame member 42 strengthens the frame member at the inlet 54 so as to reduce the stress caused by stress concentration at the opening. By adding the plate 56, the overall structure of the main frame member 42 need not be increased in overall strength and consequently weight to provide adequate strength at the opening 54. Instead, the reinforcing plate 56 provides that added strength.

Extending through the lower side of the main frame member 42 are outlets 58 and 60. The outlets 58 and 60 align and receive intake passages 62 and 64 which lead to the carburetors 48 and 50. A passageway is thus provided into the main frame member 42 through the inlet opening 54 and out of the hollow interior of the main frame member through outlet openings 58 and 60.

Positioned at the inlet opening 54 of the main frame member 42 is an air cleaner assembly, generally designated 66. The air cleaner assembly 66 includes an air cleaner element 68 of conventional filter material 70 in a case 72. A central plenum 74 is formed within the case 72 and surrounded by the filter material 70. A cover plate 76 extends across the top of the air cleaner element 68 with inlet ports 78. This air cleaner element 68 is generally to be replaced or cleaned at normal service intervals.

Associated with the air cleaner element 68 is a cover 80. The cover 80 defines the upper portion of the air cleaner assembly 66 and may conveniently be of a unitary molded product. The cover 80 includes an attachment element 82 receiving a fastener 84. The fastener 84 extends to the cover 76 of the air cleaner element 68 for attachment thereto. A nut 86 may be fixed to the cover 76 for receipt of the fastener 84. A flange 88 extending about the waist of the cover 80 receives the outer periphery of the air cleaner element 68 to locate the air cleaner element 68 with the fastener 84 in tension.

The cover 80 extends outwardly from the air cleaner element 68 to span the inlet opening 54. A resilient material 90 may be provided about the inlet opening 54 to allow the cover 80 to be positioned resiliently and interlocked with the structure of the main frame member 42. By structuring the cover 80 to span the inlet opening 54, a barrier is created preventing air from flowing into the hollow interior of the main frame member 42 without passing through the air cleaner element 42.

Extending through the cover 80 is an inlet passage 92. The inlet passage 92 allows air flow drawn in by the suction of the engine to pass into the cover 80, through the air cleaner element 68 to the intake passages 62 and 64. The inlet passage 92 is shown to open rearwardly on the motorcycle in an area of relative air quiescence. Thus, the effect of ram air flow and the like on the carburetion of the engine is minimized.

Figure 4:
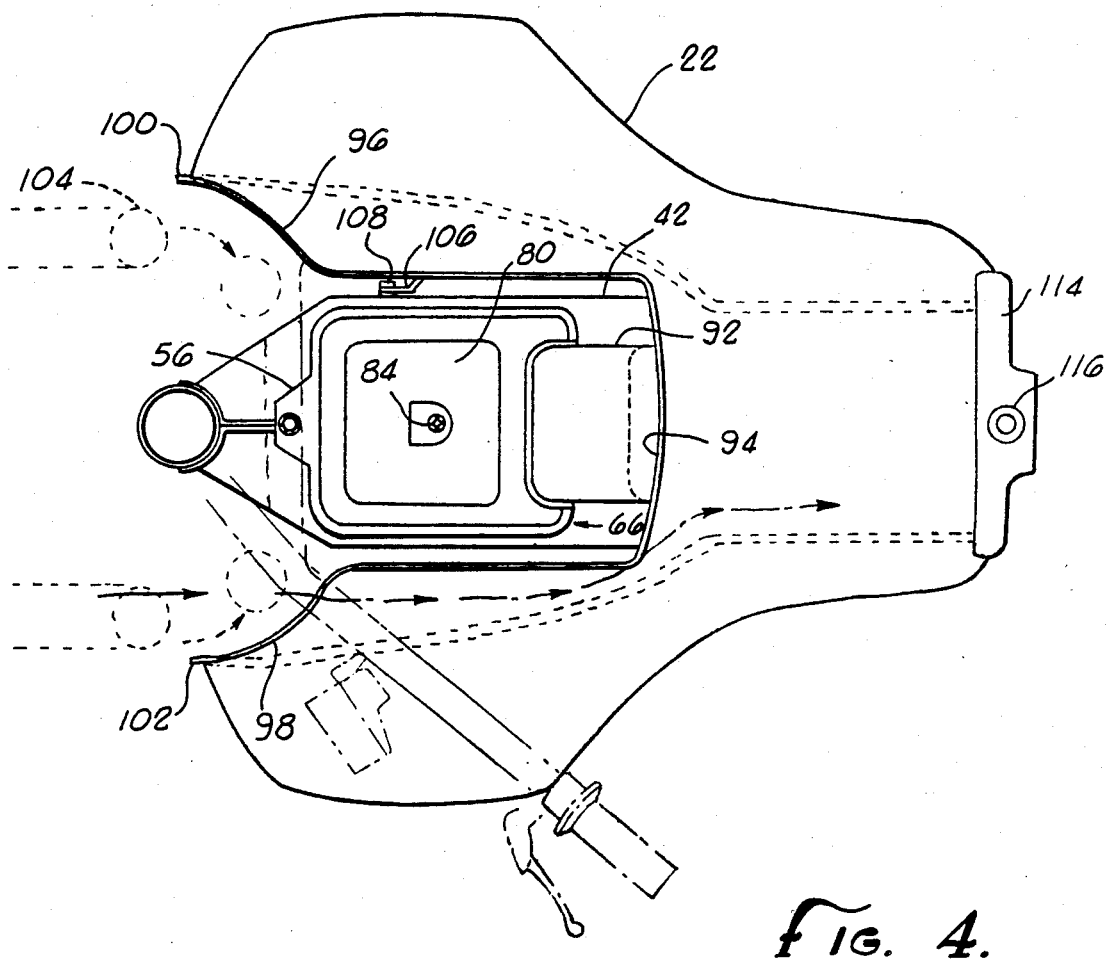
FIG. 4 is a plan view of the structure and fuel intake of a motorcycle incorporating the present invention.

The fuel tank 22 positioned on the motorcycle above and about the main frame member 42 is best illustrated in FIGS. 3 and 4 with a profile illustrated in phantom in FIG. 2. The fuel tank 22 includes a U-shaped cavity 94 which opens or faces forwardly on the motorcycle. A channel also extends fore-and-aft on the underside of the fuel tank such that the tank 22 may extend downwardly on either side of the main frame member 42. The arrangement is such that open access is provided to the air cleaner assembly 66. The air cleaner assembly 66 may then be extracted directly upwardly through the U-shaped cavity 94 for replacement or cleaning of the air cleaner element 68.

The sheet metal defining the fuel tank 22 includes inner walls 96 and 98. The inner walls 96 and 98 generally define the U-shaped cavity 94 of the fuel tank 22. Additionally, the walls 96 and 98 extend forwardly to leading edges 100 and 102 which act to direct air inwardly to within the U-shaped cavity 94 and then rearwardly between the main frame member 42 and the tank 22. The tank 22 is faced from the main frame member 42 for such air flow. The walls 96 and 98 also extend outwardly adjacent the front of the fuel tank 22 as can best be seen in FIG. 4 so as to accommodate the front fork structure 104 of the front suspension assembly 14. With steering of the handlebar to its extreme position as illustrated in phantom in FIG. 4, the front fork assembly 104 is able to pass inwardly of the extreme forward portion of the fuel tank 22.

The fuel tank 22 is fixed to the frame of the motorcycle at a plurality of locations. A hook piece 106 is mated in a groove on a boss 108 extending laterally from the main frame member 42. The fuel tank 22 is additionally bolted by means of a bracket 110 and fastener 112 illustrated in FIG. 2 to the down tube assembly 38. Additionally, a bracket 114 on the fuel tank 22 is bolted by means of a fastener 116 to a portion of the frame 12 as best seen in FIGS. 2 and 4.

Figure 5:
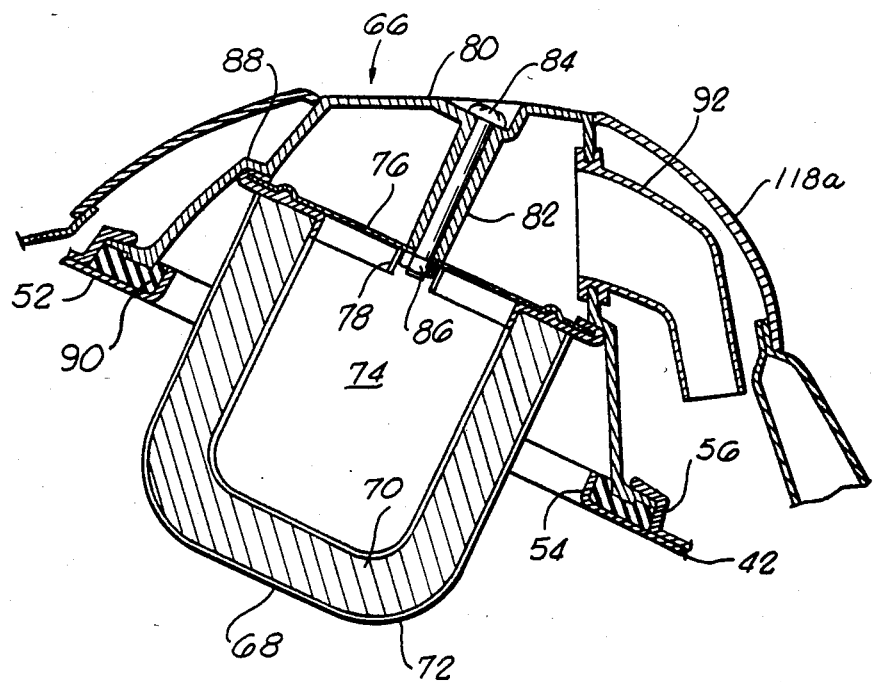
FIG. 5 is a cross-sectional side detail of an air cleaner system of the present invention.

A cover panel 118 may be positioned over the U-shaped cavity 94 for aesthetic purposes. The cover 118 is illustrated in a first embodiment in FIGS. 1, 2 and 3. The cover is removed for clarity in FIG. 4. A second embodiment of the cover panel 118a is illustrated in FIG. 5, the cover 80 of the air cleaner assembly 66 is partially exposed.

Because of the proximal location of the air cleaner assembly 66 to the intake passages 62 and 64 and the carburetors 48 and 50, back-draft of the carburetors may soil the filter element 70 during normal operation. To avoid this condition, a baffle 120 illustrated in FIG. 2 extends across the main frame member 42. The baffle is positioned so as to allow free air flow around the baffle 120 through the main frame member 42 to the outlets 58 and 60. However, the baffle 120 is arranged directly between the outlet openings 58 and 60 and the air cleaner element 68. In this way, back-draft from the carburetors will impinge directly on the baffle 120 rather than on the filter material 70. As a result, the filter material 70 will remain unsoiled by such back-draft.

Thus, an air cleaner system is disclosed employing the interior of a hollow main frame member on a motorcycle. In this way, an improved and space efficient system is defined. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A motorcycle comprising
a frame including a main frame member of hollow construction forming an enclosed cavity having an inlet opening through the upper side thereof;
a fuel tank positioned on said main frame member and having a U-shaped cavity facing forwardly on the motorcycle to extend around said opening in said main frame member; and
an air cleaner assembly positioned in said inlet opening.

2. The motorcycle of claim 1 wherein said main frame member further has at least one outlet opening through the lower side thereof.

3. The motorcycle of claim 1 wherein said main frame member is a box section having a rectangular cross section.

4. The motorcycle of claim 1 wherein said main frame member is spaced from said fuel tank to provide air flow therebetween over said air cleaner assembly.

5. The motorcycle of claim 1 having an engine with at least one intake passage, said main frame member including an outlet opening connected with each of the intake passages through the lower side of said main frame member.

6. The motorcycle of claim 5 wherein said inlet opening and said outlet openings provide the sole air communication to the hollow interior of said main frame member.

7. The motorcycle of claim 1 wherein said frame further includes a head tube and a center frame structure, said main frame member extending from said head tube to said center frame structure.

8. The motorcycle of claim 1 wherein said inlet opening includes a reinforcing plate extending about the periphery of said inlet opening.

9. The motorcycle of claim 1 wherein said air cleaner assembly includes a cover and an air cleaner element, said cover extending across said inlet opening, said air cleaner element extending beneath said cover into the cavity formed by said main frame member.

10. The motorcycle of claim 9 wherein said cover and said air cleaner element define a barrier at said inlet opening restricting air communication with the hollow interior of said main frame member to flow through said air cleaner element.

11. The motorcycle of claim 9 wherein said cover includes an inlet passage opening rearwardly on the motorcycle within said U-shaped cavity and extending through said cover into communication with said air cleaner element.

12. A motorcycle comprising
an engine having at least one intake passage;
a frame including a main frame member of hollow construction having an inlet opening through the upper side thereof and an outlet opening connected to each of said intake passages through the lower side thereof;
an air cleaner assembly positioned in said inlet opening; and
a baffle extending across said main frame member within the hollow interior thereof and being positioned between said air cleaner assembly and said outlet openings.

13. A motorcycle comprising
a frame including a main frame member of hollow construction having an inlet opening through the upper side thereof, at least one outlet opening through the lower side thereof and a baffle extending across said main frame member within the hollow interior thereof and being positioned between said air cleaner assembly and said outlet opening; and
an air cleaner assembly positioned in said inlet opening, said air cleaner assembly including a cover and an air cleaner element, said cover extending across said inlet opening, said air cleaner element extending beneath said cover into the hollow interior of said main frame member.

14. A motorcycle comprising
a frame including a main frame member of hollow construction forming an enclosed cavity having an inlet opening through the upper side thereof, at least one outlet opening through the lower side thereof and a baffle extending across said main frame member within the hollow interior thereof and being positioned between said air cleaner assembly and said outlet opening;
a fuel tank positioned on said main frame member and having a U-shaped cavity facing forwardly on the motorcycle to extend around said opening in said main frame member; and
an air cleaner assembly positioned in said inlet opening.

* * * * *